Patented Nov. 24, 1936

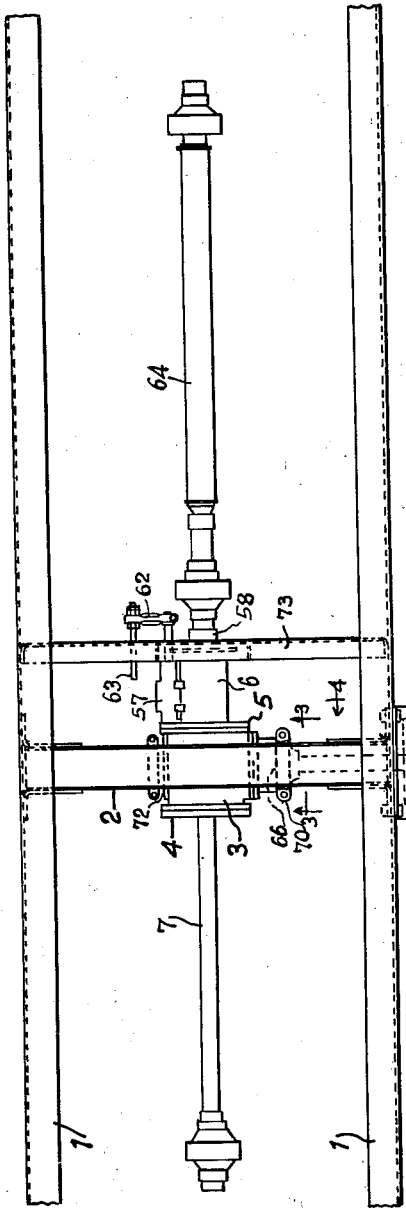

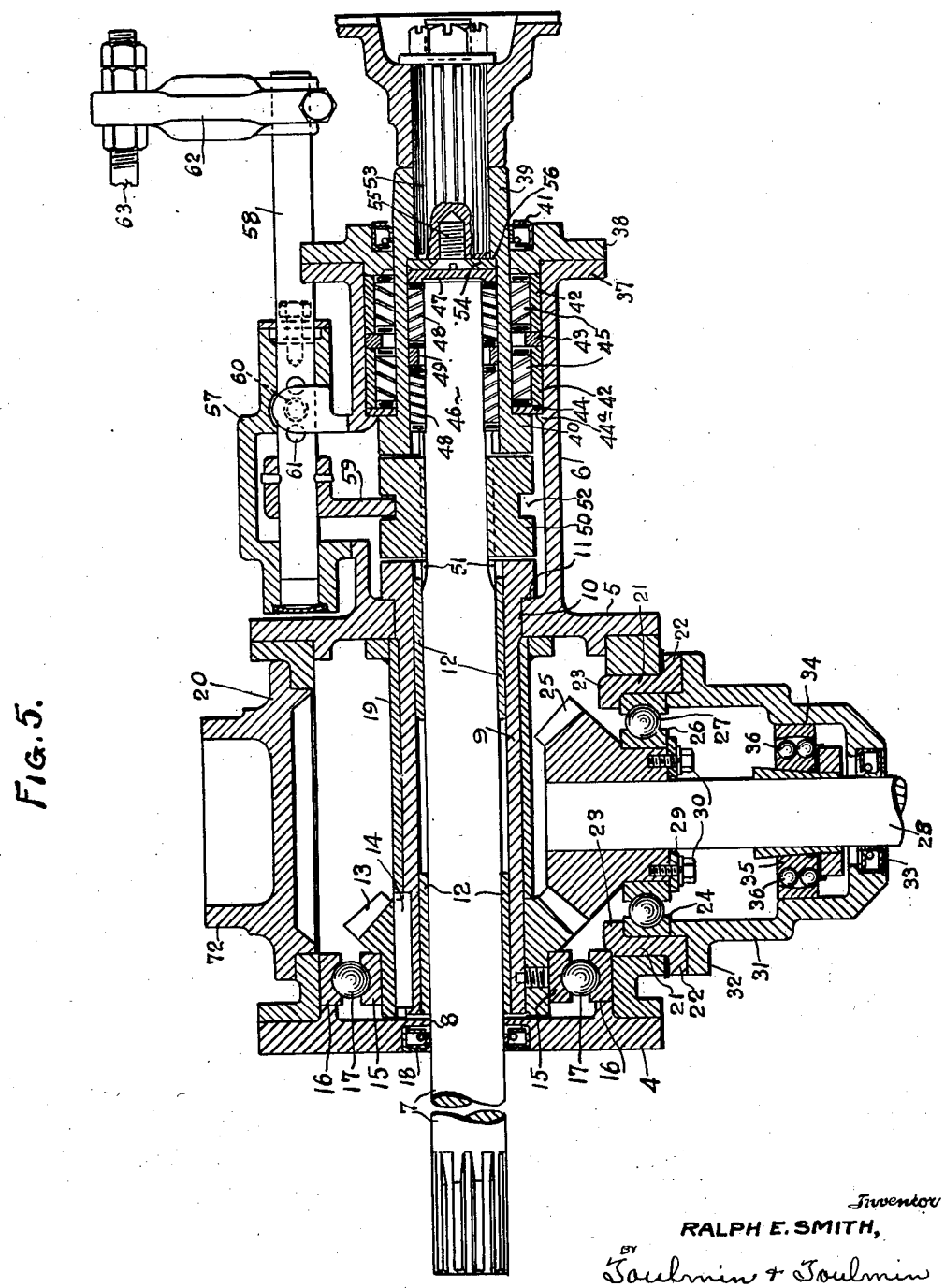

2,062,194

UNITED STATES PATENT OFFICE 2,062,194

POWER TAKE-OFF MECHANISM

Ralph E. Smith, Galion, Ohio, assignor to The Galion Metallic Vault Company, Galion, Ohio, a corporation of Ohio Application April 20, 1934, Serial No. 721,593

1 Claim. (Cl. 74—11)

This invention relates to improvements in power take-off mechanism, and has for its object to provide means whereby power may be taken from a power shaft forming part of the drive shaft of an automotive vehicle without interfering with the operation of the vehicle, the take-off mechanism and the driven shaft for propelling the automotive vehicle being connected to the power shaft by means of a selective clutch mechanism operated by a single instrumentality controlled from the cab of the vehicle.

It is a particular object of this invention to provide, in connection with a driven shaft, a plurality of power take-off mechanisms and a single clutch member for connecting the drive shaft to said mechanisms.

These and other objects and advantages will appear from the following description taken in connection with the drawings.

Referring to the drawings:

Figure 1 is a top plan view of part of an automobile frame showing applicant's power take-off mechanism attached thereto.

Figure 2 is a side elevation of the power take-off mechanism, together with part of the frame to which it is attached.

Figure 3 is a section on the line 3—3 of Figure 1.

Figure 4 is a section on the line 4—4 of Figure 1.

Figure 5 is a horizontal section through the power take-off mechanism.

The present take-off mechanism is adapted to be used in connection with motor vehicles which have thereon the usual frame, consisting of longitudinally arranged side members 1 connected by means of cross members, such as 2. The power take-off mechanism is supported by the transverse member 2, and consists essentially of a cylindrical housing 3 which is open at each end and closed at one end by means of a closure plate 4, and at the other end by means of a closure plate 5 which has a rearwardly extending cylindrical sleeve 6.

Extending longitudinally through the central part of the cylindrical housing is a shaft 7 forming part of the drive shaft of the engine. This shaft extends through a hole 8 in the closure plate 4, and has around it a closely fitting hollow shaft 9 which extends through a hole 10 in the closure plate 5. This shaft has a shoulder 11 which abuts the rear face of the closure plate 5. Between the hollow shaft 9 and the shaft 7 are bushings 12.

On the forward end of the hollow shaft 9 is a gear 13, held against rotation thereon by means of a single key 14. The forward end of this gear is hub-shaped and has thereon a grooved ring 15, which cooperates with a similarly grooved ring 16 in forming a runway for balls 17. The ring 16 is supported in the forward end of the cylindrical housing 3. Around the shaft 7 and in a space provided therefor in the plate 4 is a packing element 18. Around the hollow shaft 9 is a sleeve 19 which extends from the gear 13 to the plate 5.

One side of the cylindrical housing is open for assembly purposes and is provided with a closure 20 suitably attached to the housing. The side of the housing opposite the closure 20 is provided with an opening in which there is a ring 21. One edge of this ring has an outwardly extending flange 22 which engages one side of the housing. The other edge of this ring has an inwardly extending flange 23 which serves as a retainer for a grooved bearing ring 24. For engagement with the gear 13 there is provided a gear 25 which has around its hub part a ring 26 cooperating with the ring 24 in forming a runway for anti-friction balls 27. The gear 25 is supported on one end of a shaft 28, which has around it a washer 29 attached to the gear 25 by means of screws 30. This washer serves to maintain the ring 26 in position on the gear 25.

Cooperating with the flange 23 in holding the ring 24 in position is a cap member 31, which has thereon an outwardly and radially extending flange 32, which engages the ring 21 while the main inwardly extending part of this cap engages the ring 24. The cap 31 and the ring 21 may be attached to the housing in any suitable manner. The shaft 28 extends through a hole provided therefor in the cap 31. This cap has in this hole, around the shaft, a packing 33 which aids in the retention of lubricant. Within the cap is a ring 34 and around the shaft 28 within the ring 34 is a ring 35, which cooperates with the ring 34 in forming a ball-race for anti-friction balls 36. These bearing elements are held in position in the cap and on the shaft by any suitable means.

On the rear end of the cylindrical sleeve 6 is a flange 37, to which is attached a plate 38. This plate has in its center a hole through which a hollow shaft 39 extends. On the inner end of this hollow shaft is a shoulder 40. Around the shaft 39 and within a space provided therefor in the plate 38 is a packing element 41, which serves to retain a lubricant within the cylindrical sleeve 6. Within this sleeve are two bearing rings 42, spaced from each other by means of a spacer ring 43. One of these rings fits closely against the inner face of the plate 38, while the other ring fits against a washer 44, which fits against the shoulder 40 and a shoulder 44a on the sleeve 6. Between the rings 42 and the hollow shaft 39 are roller bearings 45. All bearing elements are made of hard steel, and where the elements are not of such material bearing rings are provided, such as 42.

The rear end of the shaft 7 is reduced at 46 and abuts a bearing plate 47 closely fitting within the shaft 39. Between the reduced part 46 of the shaft 7 and the shaft 39 are roller bearings 48 arranged in two sets, spaced from each other by means of a spacer ring 49. These roller bearings are retained at one end by means of the plate 47 and at the other end by means of a shoulder formed by the reduced part 46 of the shaft 7. Between the adjacent ends of the shaft 9 and the shaft 39 is a clutch member 50, which has on each end a clutch element adapted to engage a corresponding clutch element on one of the hollow shafts. This clutch member is slidably mounted on the shaft 7 but held against rotation by means of spline 51.

Around the periphery of the clutch member is a groove 52 adapted to receive a yoke, later to be described. In the rear end of the shaft 39 is a shaft 53, which has on its inner end a plate 54 attached thereto by means of a screw 55. This plate 54 fits behind a shoulder 56 formed in the rear end of the shaft 39. Suitably attached to one side of the cylindrical sleeve 6 is a casing 57, which has extending longitudinally therethrough a shaft 58 to which a yoke 59 is attached. This yoke extends through an opening provided therefor in the side of the sleeve 6, and fits in the groove 52 in the clutch member for moving the clutch longitudinally with regard to the shaft 7 and into and out of engagement with the clutch elements on the hollow shaft 9 or the hollow shaft 39.

The shaft 58 is adapted to assume any one of three positions, and for that purpose there is provided in the casing a spring-pressed ball 60 adapted to fit in any one of three depressions 61 formed in the shaft. When the ball is in one depression the clutch member is in neutral position. When the ball is in another depression the clutch member will engage the hollow shaft 39, while if the ball is in the third depression the clutch member will engage the hollow shaft 9.

To the free end of the shaft 58 is attached one end of an arm 62, which has attached to its other end one end of an operating rod 63. This rod may be connected to some operating mechanism located in the cab of the truck to which the power take-off mechanism is attached. 64 is a shaft which connects the shaft 53 to a mechanism for operating the traction part of the truck. For supporting the shaft 28 one of the longitudinal side members is provided with a bearing 65.

The housing 3 is supported by suspending elements, such as shown in Figure 3. For engagement with the cap 31 there is provided a pair of yoke members 66, which have oppositely extending ears 67 through which bolts 68 extend. These bolts have nuts 69 thereon for clamping the two yoke members together around the cap 31. The upper ends of these bolts 68 extend through holes provided in the ends of the plate 70 located on top of the transverse member 2. For the purpose of holding these bolts and adjusting them with relation to the plate 70, nuts 71 are provided.

An extenson 72 formed on the closure 20 is provided with a similar supporting member so that its housing is supported on opposite sides beneath the transverse member 2. The rearward part of the housing, such as the cylindrical sleeve 6, may be similarly supported from a transverse member 73. The shaft 7 may be considered the driving shaft and the shafts 28 and 53 the driven shafts. The shaft 53 is so connected to the hollow shaft 39 that it will rotate with the shaft.

When the clutch member 50 is in its forward position the hollow shaft 9 rotates with the shaft 7, and through the gears 13 and 25 will rotate the shaft 28. During the rotation of the shaft 28 the shaft 53 is stationary, and the power is disconnected from the traction parts of the truck. When the clutch member 50 is moved rearwardly so that its clutch elements will engage the clutch elements on the hollow shaft 39, the shaft 39 will rotate and through it rotate the shaft 53 and cause the traction elements of the truck to operate. At this time the shaft 28 is idle. These operations may be controlled by a suitable lever connected to the rod 63.

I desire to comprehend within my invention such modifications as may be embraced within my claim and the scope of my invention.

Having thus fully described my invention, what I claim as new and desire to secure by Letters Patent, is:

In a power take-off, a housing, a drive shaft having the free end thereof reduced, a hollow driven shaft having a bearing in one end thereof for supporting said reduced end of said drive shaft, said housing having a transverse partition intermediate its ends, a hollow take-off shaft having on one end thereof a take-off gear with an integral sleeve supported in said housing adjacent one end thereof by a roller bearing and being rotatably mounted on the other end of the drive shaft within the housing and supported by the transverse partition in said housing, said hollow take-off shaft and said hollow driven shaft having clutch members defined on the opposed ends thereof, and a clutch member between said shaft ends, slidable on said drive shaft and rotatable therewith, said clutch member having on each end thereof a clutch element engageable respectively with the clutch elements on the hollow take-off shaft and on the hollow drive shaft, whereby the drive shaft may be selectively connected with either said driven shaft or said take-off shaft.

RALPH E. SMITH.